(12) United States Patent  
Hori et al.

(10) Patent No.: US 8,421,421 B2
(45) Date of Patent: Apr. 16, 2013

(54) STORAGE SYSTEM INCLUDING A PLURALITY OF BATTERY MODULES

(75) Inventors: Masanori Hori, Odawara (JP); Manabu Yamagata, Minamiashigara (JP); Taro Takahashi, Manazuru (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/414,999

(22) Filed: Mar. 8, 2012

(65) Prior Publication Data

US 2012/0161720 A1    Jun. 28, 2012

Related U.S. Application Data

(63) Continuation of application No. 12/232,157, filed on Sep. 11, 2008, now Pat. No. 8,154,257.

(30) Foreign Application Priority Data

Jul. 23, 2008    (JP) .................. 2008-190188

(51) Int. Cl.
*H02J 7/04*    (2006.01)
*H02J 7/16*    (2006.01)

(52) U.S. Cl.
USPC ............................................ 320/162; 320/126

(58) Field of Classification Search ........................ None
See application file for complete search history.

(56) References Cited

U.S. PATENT DOCUMENTS

| | | | |
|---|---|---|---|
| 6,160,376 | A | 12/2000 | Kumar et al. |
| 6,184,565 | B1 | 2/2001 | Beasom |
| 6,741,065 | B1 | 5/2004 | Ishii et al. |
| 7,019,488 | B2 | 3/2006 | Nakao |
| 7,610,498 | B2 | 10/2009 | Sutardja |

FOREIGN PATENT DOCUMENTS

| | | |
|---|---|---|
| JP | 9-215217 | 8/1997 |
| JP | 10-271705 | 10/1998 |
| JP | 2002-78227 | 3/2002 |

*Primary Examiner* — Ramy Ramadan
(74) *Attorney, Agent, or Firm* — Stites & Harbison PLLC; Juan Carlos A. Marquez, Esq.; Nicholas B. Trenkle, Esq.

(57) ABSTRACT

In a storage system provided with a plurality of storage modules, the rated power consumption can be reduced. The storage system is provided with a charge control unit. The charge control unit stops, when detecting that a predetermined number of a plurality of battery modules are during battery charging, the battery charging in the remaining battery modules.

15 Claims, 6 Drawing Sheets

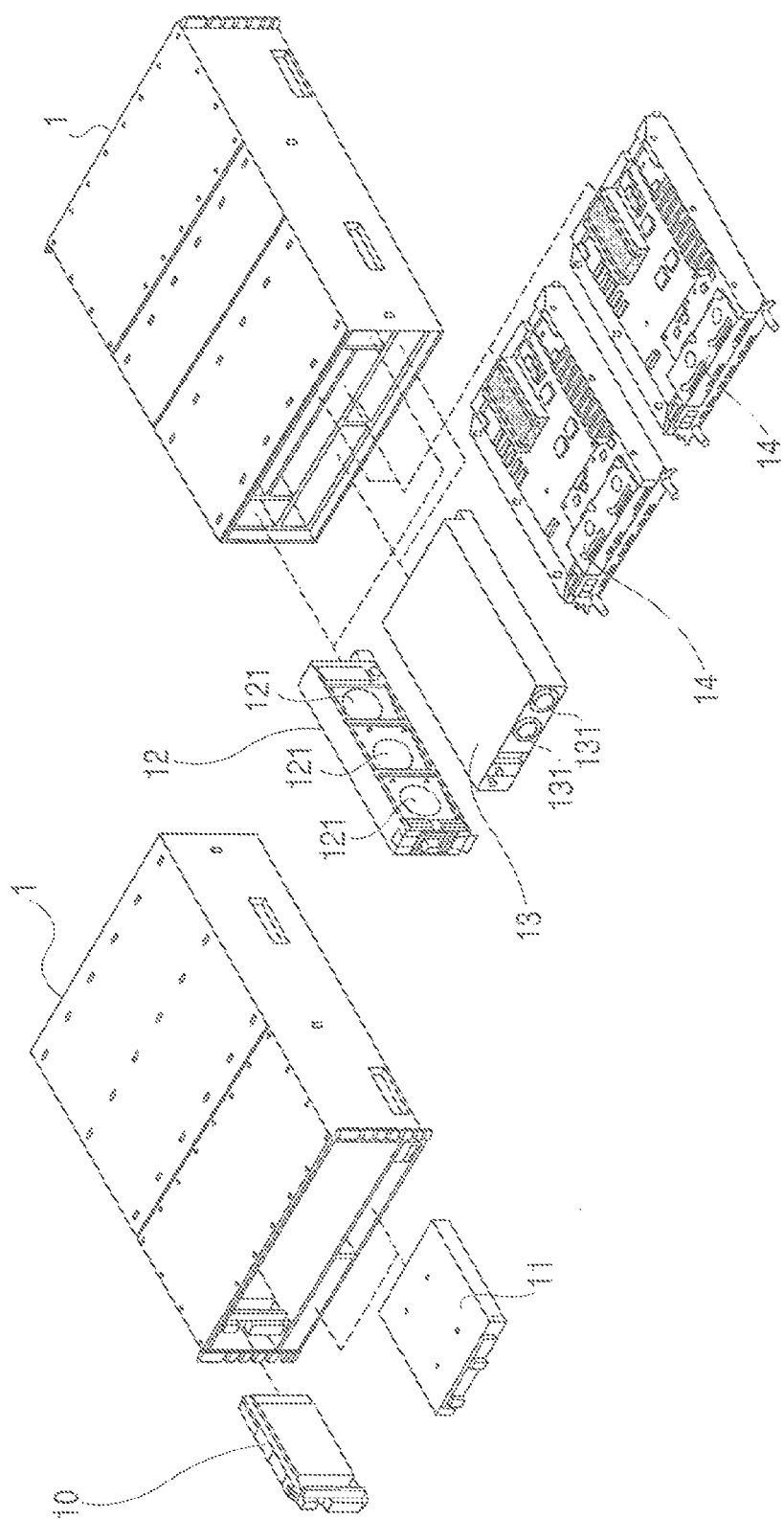

STORAGE SYSTEM INCLUDING A PLURALITY OF BATTERY MODULES

CROSS REFERENCES TO RELATED APPLICATIONS

This application is a Continuation of U.S. application Ser. No. 12/232,157 filed Sep. 11, 2008. Priority is claimed from U.S. application Ser. No. 12/232,157 filed Sep. 11, 2008, which claims priority from Japanese Patent Application No. 2008-190188, filed on Jul. 23, 2008, the entire disclosure of which is incorporated herein by reference.

BACKGROUND OF THE INVENTION

1. Field of the Invention

The present invention relates to a storage system including a plurality of battery modules.

2. Description of the Related Art

A storage system including a plurality of battery modules has been well known. The battery modules are each generally provided with a battery, and a charger that makes a supply of direct current from a power source to the battery. When a power failure or any power source failure occurs, with power provided by the battery modules, data stored in a volatile memory, e.g., cache memory, is backed up on nonvolatile storage resources, e.g., hard disk or flash memory.

Patent Document 1 (JP-A-9-215217) describes a battery charging device that can charge a plurality of batteries. Patent Document 2 (JP-A-10-271705) describes a power source circuit provided with a charging circuit that supplies a charging current to a battery in a battery pack. Patent Document 3 (JP-A-2002-78227) describes a battery charging control device that controls both an electronic device and a power supply to a battery in accordance with a priority over operation or battery charging.

A storage system desirably has the lower rated power consumption. As an improvement therefor, charging control over the storage system, i.e., a plurality of batteries in a plurality of battery modules, is worthy of note.

The concern here is that none of above Patent Documents 1 to 3 describes a technology applicable to charging control over such a storage system, i.e., the batteries in the battery modules. That is, Patent Documents 1 merely describes one battery module, i.e., battery charging device, and Patent Document 2 merely describes one battery module, i.e., battery pack. Patent Document 3 merely describes one battery.

SUMMARY OF THE INVENTION

An object of the invention is to reduce the rated power consumption of a storage system including a plurality of storage modules.

A storage system is provided with a charge control unit. The charge control unit stops, when detecting that a predetermined number of a plurality of battery modules are during battery charging, the battery charging in the remaining battery modules.

As an exemplary configuration, a plurality of battery modules are each provided with a charger that supplies power from a power source to the battery of its own, and a charge controller that controls a power supply from the charger to the battery. In this configuration, a plurality of charge controllers respectively provided in the battery modules configure a charge control unit. The charge controllers are each connected to one or more of the remaining charge controllers by one or more first signal lines and one or more second signal lines. On the first signal line(s), a signal indicating the state of charge in the battery module including the charge controller flows, and on the second signal line(s), a signal indicating the state of charge in the one or more of the remaining battery modules including the one or more of the remaining charge controllers. The charge controllers each determine whether there is an indication of during-charging for the signals flowing over a predetermined number of the one or more second signal lines. When such a determination result is negative, the charge controllers each put the charger in its own battery module in charge to make the power supply therefrom to the battery, and when the determination result is positive, the charge controllers each make the charger to stop the power supply therefrom to the battery.

The number of the battery modules may be even or odd. To be specific, for example, a storage system may be provided with one or more pairs of the battery modules, or with a plurality of battery modules not paired. With the former case, in each of the pairs, when one of the battery modules is during battery charging, the remaining battery module is not during battery charging.

The storage system is provided with a plurality of controllers, for example. When a predetermined number or more of the controllers are in the state of low power consumption, the predetermined number or more of the battery modules may be allowed to be charged all at once.

BRIEF DESCRIPTION OF THE DRAWINGS

FIG. 1A is an external perspective view of a storage system of a first embodiment of the invention, viewed from the front;

FIG. 1B is another external perspective view of the storage system thereof, viewed from the rear;

DESCRIPTION OF THE PREFERRED EMBODIMENTS

In the below, several embodiments of the invention are described.

First Embodiment

FIG. 1A is an external perspective view of a storage system of a first embodiment of the invention, viewed from the front. FIG. 1B is an external perspective view of the storage system, viewed from the rear. Herein, various components configuring the storage system are not restricted in number as below, e.g., controllers, battery modules, and AC/DC (Alternating Current/Direct Current) power supplies.

In a chassis 1, a backboard 210 (refer to FIGS. 2A and 2B) is provided each on the front and rear surface sides for partitioning the space in the chassis 1.

Figure 2A:
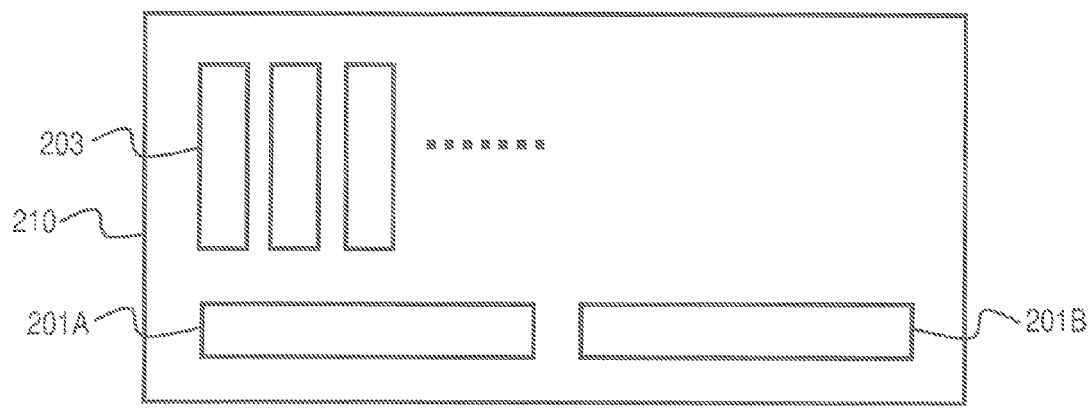
FIG. 2A is a front view of a backboard.

As shown in FIG. 2A, the backboard 210 on the front side is provided with a plurality of HDD-use connectors 203 for connection with a plurality of hard disk drives (HDDs) 10, and two battery-module-use connectors 201A and 201B for connection with two battery modules 11. Accordingly, as shown in FIG. 1A, the chassis 1 is incorporated with, on the front surface side, a plurality of HDDs 10 and the two battery modules 11. As alternatives to the HDDs 10, any other types of physical storage devices, e.g., flash memory devices, may be provided.

Figure 2B:
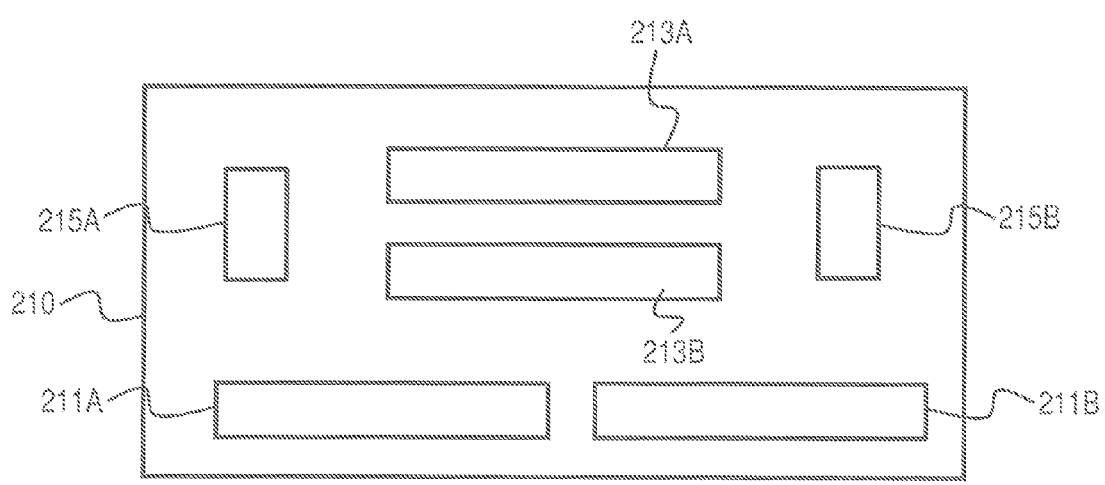
FIG. 2B is a rear view of the backboard.

As shown in FIG. 2B, the backboard 210 on the rear surface side is provided with two cooling-module-use connectors 215A and 215B for connection with two cooling modules 12, two power-supply-use connectors 211A and 211B for connection with two AC/DC power supplies 13, and two controller-use connectors 213A and 213B for connection with two controllers 14. Accordingly, as shown in FIG. 1B, the chassis 1 is incorporated with, on the rear surface side, the two cooling modules 12, the two AC/DC power supplies 13, and the two controllers 14.

The two battery modules 11 are respectively inserted into two battery-module-use slots 18. These slots 18 are each assigned a number. As will be described later, the numbers (slot numbers) assigned to the slots 18 can be each acknowledged by the inserted battery module 11 receiving a signal of the slot number from the connected battery-module-use connector 201A (or 201B).

The two cooling modules 12 are disposed on the right and left on the upper stage on the rear surface side. The cooling modules 12 are each provided with three fans 121. In the chassis 1, by these fans 121, the HDDs 10 and the controllers 14 are cooled.

The AC/DC power supplies 13 each convert an alternating current from a commercial power supply into a direct current, and supply the resulting current to various types of loads. These two AC/DC power supplies 13 are disposed side by side on the lower stage on the rear surface side. The AC/DC power supplies 13 are each provided with two fans 131. The fans 131 cool the AC/DC power supplies 13 and the battery modules 11.

The HDDs 10 are disposed side by side on the upper stage on the front surface side. The two battery modules 11 are disposed side by side on the lower stage on the front surface side.

The two controllers 14 are disposed one on the other on the upper stage on the rear surface side, i.e., the controller 14 on the upper side is disposed upside down with respect to the controller 14 on the lower side. The controllers 14 are each in charge of control over data transfer with any host device such as host computer, and control over data transfer with the HDDs 10. The controllers 14 each monitor the state of the components, i.e., the cooling modules 12, the AC/DC power supplies 13, and the remaining controllers 14, and control the fans 121 of the cooling modules 12 and the fans 131 of the AC/DC power supplies 13.

Figure 3:
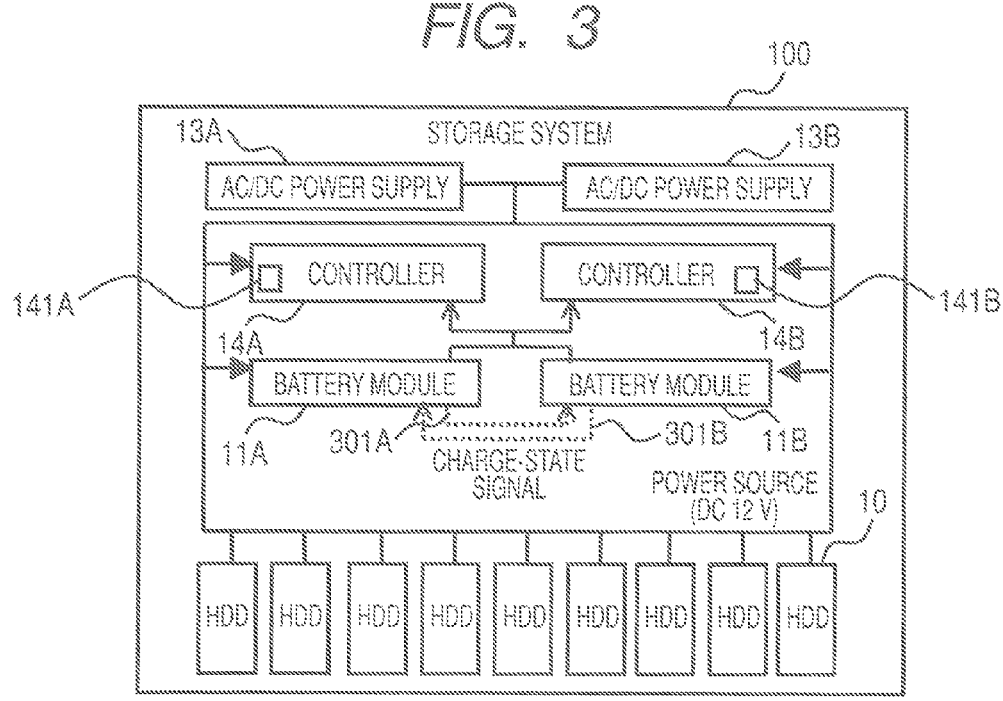
FIG. 3 is a diagram showing the internal configuration of the storage system of the first embodiment of the invention.

FIG. 3 shows the internal configuration of the storage system. Note that, in FIG. 3, the reference numerals of any redundant components, i.e., the AC/DC power supplies, the controllers, and the battery modules, are configured by parent numbers of 13, 14, and 11 with child numbers of A and B. The two cooling modules 12 and the backboards 210 are not shown in FIG. 3.

From the two AC/DC power supplies 13A and 13B, a direct current is provided via the backboards 210 to the components, i.e., a plurality of HDDs 10, the two battery modules 11A and 11B, the two controllers 14A and 14B, and the two cooling modules 12. The two controllers 14A and 14B are respectively provided with volatile memories 141A and 141B. The volatile memories 141A and 141B are each a cache memory, for example. These cache memories temporarily store data received by the controllers 14A and 14B from the host device of a storage system 100, e.g., host computer, for writing into the HDDs 10, and data read by the controllers 14A and 14B from the HDDs 10 for transmission to the host device.

Even if either the AC/DC power supply 13A or 13B stops its operation due to failure or others, if the remaining AC/DC power supply 13B or 13A can make a power supply, the loads can be operated. That is, the storage system 100 can be operated in its entirety. If this is the case, for example, the volatile memories 141A and 141B are provided with no power supply from the batteries in both the battery modules 11A and 11B. However, when a detection is made in the storage system 100 that the power supply both from the AC/DC power supplies 13A and 13B is cut off, the batteries in the two battery modules 11A and 11B discharge all at once so that the loads, i.e., at least the volatile memories 141A and 141B, are provided with the power supply from the batteries in the two battery modules 11A and 11B. The power from the batteries is consumed by a data backup process. To be specific, while there is a power supply from the batteries to the volatile memories 141A and 141B, the backup process is executed to save the data stored in the volatile memories, e.g., especially data not yet written into the HDDs 10, to the HDDs 10. The HDDs 10 are not restrictive, and may be nonvolatile storage resources of any other type.

The battery modules 11A and 11B are connected to each other by two signal lines 301A and 301B. These two signal lines 301A and 301B are printed on the backboards 210, for example. Signals flowing over the signal lines 301A and 301B are those indicating the state of charge. Such signals are hereinafter referred to as charge-state signals. To be specific, signals flowing over the signal line 301A are those indicating the state of charge in the battery module 11A, and signals flowing over the signal line 301B are those indicating the state of charge in the battery module 11B. The charge state signals are voltage-level signals, for example.

In the below, the internal configuration of the battery modules 11A and 11B is described with an example of the battery module 11A.

Figure 4:
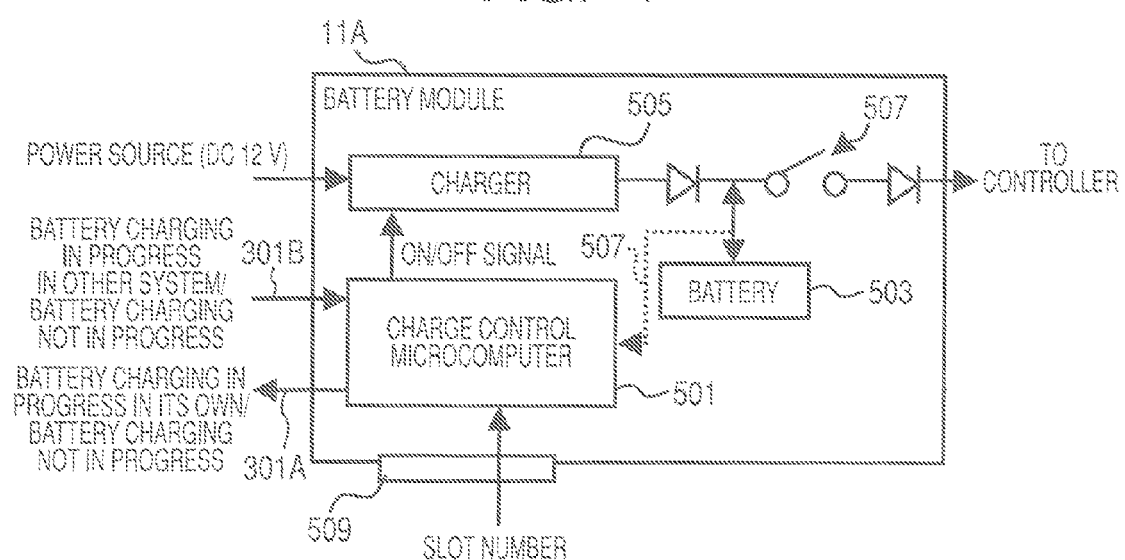
FIG. 4 is a diagram showing the internal configuration of a battery module of the first embodiment of the invention.

FIG. 4 is a diagram showing the internal configuration of the battery module 11A. The remaining battery module 11B has the same internal configuration of FIG. 4.

The battery module 11A is configured to include a battery 503, a switch 507, a charger 505, and a charge control microcomputer 501.

The switch 507 is in charge of switching between power-supply/no-power-supply from the battery 503 to the volatile memories 141A and 141B in the controllers 14A and 14B. The switch 507 is generally being turned ON. Herein, even if the switch 507 is being turned ON, while there is a power supply from the AC/DC power supply 13A and/or 13B to the volatile memories 141A and 141B, the power from the battery 503 is not reaching the volatile memories 141A and 141B, and when the power supply from both the AC/DC power supplies 13A and 13B is stopped to the volatile memories 141A and 141B, the power from the battery 503 reaches the volatile memories 141A and 141B.

The charger 505 can be in the ON/OFF state and when being in the ON state, the charger 505 supplies the direct-current power from the AC/DC power supplies 13A and 13B to the battery 503, and when being in the OFF state, the charger 505 does not make such a supply to the battery 503.

Through control over the ON/OFF state of the charger 505 as such, the charge control microcomputer 501 controls the power supply/no-power supply from the charger 505 to the battery 503.

The signal lines 301A and 301B are connected to the charge control microcomputer 501. While battery charging is performed in the battery module 11A, the charge control microcomputer 501 changes, to H level, the level of a charge-state signal flowing over the signal line 301A. In accordance with the level of a charge-state signal flowing over the signal line 301B, the charge control microcomputer 501 controls the ON/OFF state of the charger 505.

A connector 509 provided in the battery module 11A is connected to the battery-module-use connector 201A or 201B provided to the backboard 210. Through the connector 201A or 201B being connected as such, the charge control microcomputer 501 is provided with a signal indicating a slot number assigned to the slot 18 inserted with the battery module 11A.

The charge control microcomputer 501 monitors a signal 507 representing the voltage of the battery 503. When detecting that the voltage of the battery 503 is reduced to a first threshold value or smaller due to natural discharge, for example, the charge control microcomputer 501 starts a charge control process of FIG. 5. The charge control process of FIG. 5 is started not only when the voltage of the battery 503 is reduced to a first value or smaller as such but also when the storage system 100 is activated for the first time, i.e., when power is turned on for the storage system 100 that has been provided with no power from the AC/DC power supplies 13A and 13B, and when a discharge occurs from the battery 503 due to power failure or others.

Although not shown, the battery module 11A is provided with an output section that indicates the state in the battery module 11A. The output section is configured by one or more LEDs (Light-Emitting Diodes), e.g., green and red LEDs. These LEDs are controllably turned ON or OFF by the charge control microcomputer 501. To be specific, the green LED is turned ON when the battery 503 stores enough power for backup for a predetermined duration of time, i.e., when the battery 503 has the voltage of a second threshold value or larger, and blinks during battery charging, e.g., as a result of the battery 503 not having enough power, or as a result of the storage system 100 being activated for the first time. During supplemental battery charging, i.e., when the battery 503 has some level of power, the green LED is not blinked but is turned ON. When the battery module 11A becomes incapable of data backup or others due to a failure or others, the green LED is turned OFF but the red LED is turned ON. By the red LED being turned ON as such, an operator is encouraged to exchange the battery module 11A.

Figure 5:
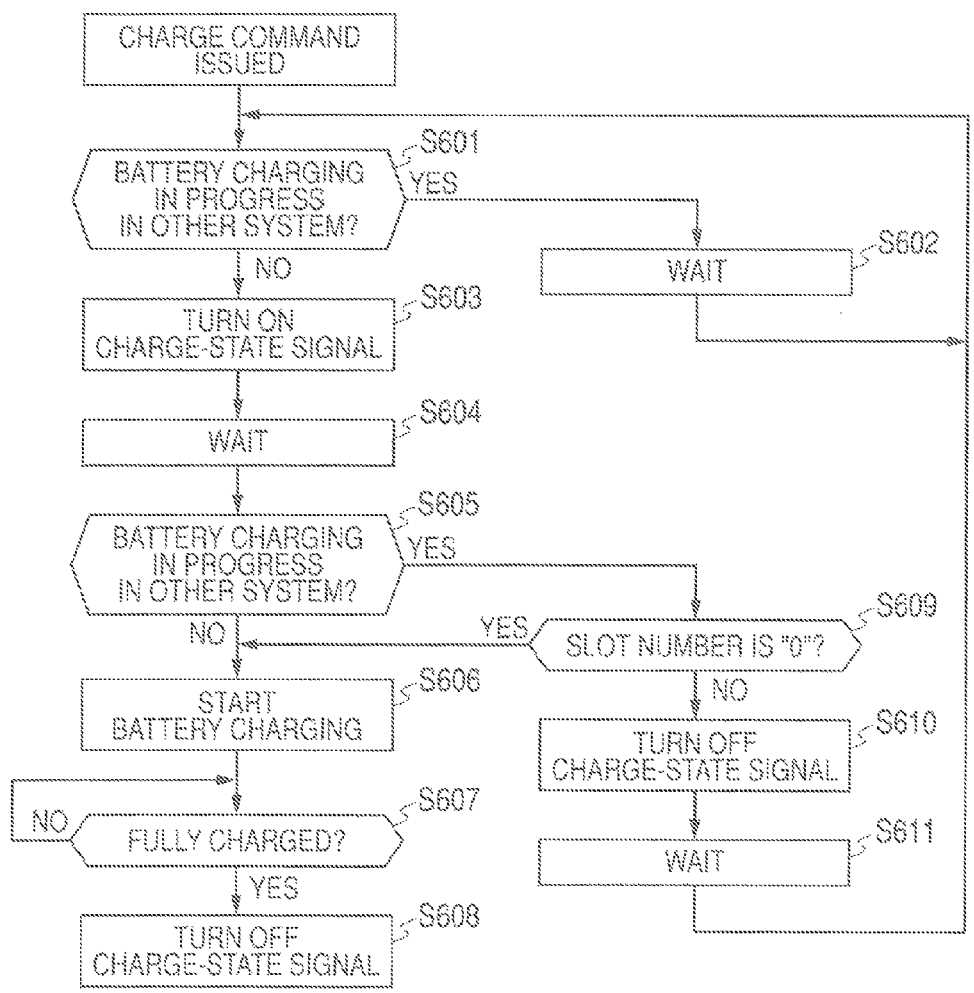
FIG. 5 is a flowchart of a charge control process.

FIG. 5 is a flowchart of a charge control process to be executed by the charge control microcomputer 501 in the battery module 11A.

When a charging command comes, the charge control process is responsively started. The charging command is issued, as described above, when the battery 503 has the voltage of the first threshold value or smaller, when the storage system 100 is activated for the first time, and after a discharge from the battery 503 due to power failure or others.

The charge control microcomputer 501 determines whether any other system is during battery charging or not (S601). To be specific, the charge control microcomputer 501 determines whether a charge-state signal flowing over the signal line 301B is at the H level or not.

When the determination result of S601 is positive (S601: YES), the charge control microcomputer 501 does not perform the battery charging, i.e., does not turn ON the charger 505. After the lapse of a fixed length of time, e.g., after the lapse of five minutes, (S602), the charge control microcomputer 501 executes the process of S601.

When the determination result of S601 is negative (S601: NO), the charge control microcomputer 501 turns ON the charge-state signal flowing over the signal line 301A (changes the signal level from L to H) (S603). After the lapse of a fixed length of time, e.g., after the lapse of five seconds (S604), the charge control microcomputer 501 determines whether any other system is during battery charging or not (S605). That is, the charge control microcomputer 501 determines whether the remaining module 11B is during the battery charging or not.

When the determination result of S604 is negative (S605: NO), the charge control microcomputer 501 turns ON the charger 505 so that the battery charging is started (S606). When detecting that the battery 503 is fully charged from the signal 507 representing the voltage of the battery 503, for example (S607: YES), the charge control microcomputer 501 stops the battery charging by turning OFF the charger 505, and turns OFF the charge-state signal flowing over the signal line 301A, i.e., changes the signal level from H to L (S608).

When the determination result of S605 is positive (S604: YES), the charge control microcomputer 501 determines whether the slot number is "0" or not (S609). As an example, when the battery module 11A is connected to the battery-module-use connector 201A, a signal representing the slot number "0" is provided to the charge control microcomputer 501.

When the determination result of S609 is positive (S609: YES), the charge control microcomputer 501 executes the process of S606, i.e., the battery charging is started. Note that, in this case, because the slot number "0" is not detected in the remaining module 11B, the battery charging is not started therein, i.e., the charge-state signal flowing over the signal line 301B is turned OFF.

On the other hand, when the determination result of S609 is negative (S609: NO), the charge control microcomputer 501 turns OFF the charge-state signal flowing over the signal line 301A (S610). That is, the battery charging is not started. After the lapse of a predetermined length of time (S611), the charge control microcomputer 501 executes the process of S601.

As such, in the first embodiment, the charge control microcomputer 501 of one of the battery modules, i.e., the battery module 11A, is so configured as to be able to detect the charge state in the remaining battery module 11B. When detecting that the battery charging is in progress in the battery module 11B, the charge control microcomputer 501 does not perform the battery charging even if a charging command is provided. This thus favorably prevents the battery charging from being performed at the same time in the two battery modules 11A and 11B in the storage system 100, thereby being able to suppress the rated power consumption in the storage system 100.

In the embodiment above, when the charge-state signal is at the H level both in the signal lines 301A and 301B at the same time, the simultaneous battery charging is prevented from being performed in the two battery modules 11A and 11B in the process of S609 of FIG. 5. Alternatively, the requirements for use to determine which of the two modules 11A and 11B is firstly battery-charged are not restrictive to the slot number "0", and any other type of requirements will also do.

Moreover, in the above first embodiment, the number of the backup modules is two. Alternatively, the number of the backup modules may be determined in accordance with the storage capacity of the volatile memories 141A and 141B. This is because the amount of data to be saved into the HDDs 10 by the backup process is varied in accordance with the storage capacity of the volatile memories.

Figure 6:
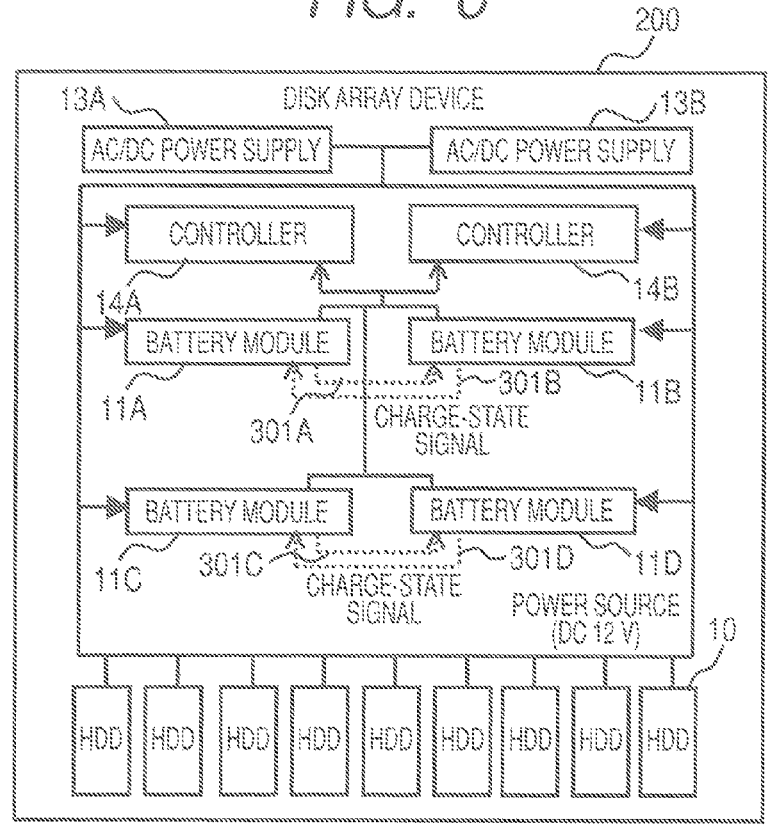
FIG. 6 is a diagram showing the internal configuration of a storage system in a first modified example of the first embodiment of the invention.

To be specific, as a first modified example, for example, as shown in FIG. 6, two battery module pairs may be provided. If this is the case, every battery module pair is connected with a signal line (301A, 301B) and (301C, 301D) for connecting the battery modules (11A, 11B) and (11C, 11D) configuring the battery module pair.

Figure 7:
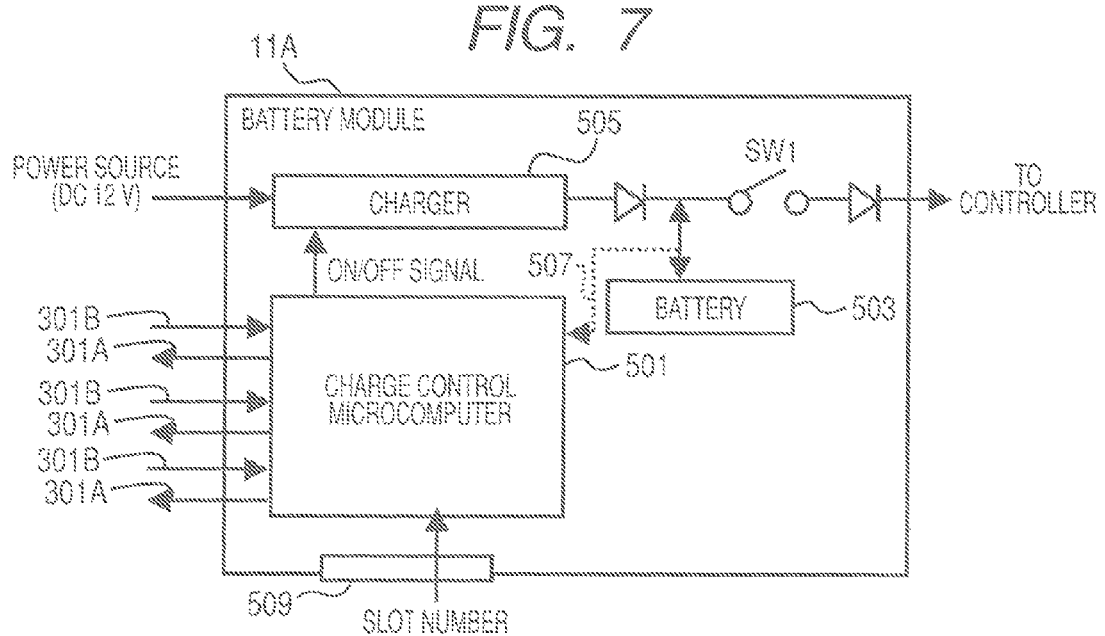
FIG. 7 is a diagram showing a battery module in a second modified example of the first embodiment of the invention.

The battery modules are not necessarily in pair. In other words, the number of the battery modules may be odd. If this is the case, the battery modules can each detect the charge state of any other battery modules. Specifically, as a second modified example, when four battery modules are provided in the storage system 100, as shown in FIG. 7, the charge control microcomputers 501 in the respective battery modules are connected to three signal lines (301A, 301B) leading to the charge control microcomputers in the three other battery modules. The charge control microcomputer 501 changes, when the battery charging is in progress in the battery module of its own, the level of the charge-state signals flowing over the three signal lines 301A all at once to H, and when the battery charging is not in progress in the battery module, the charge-state signals flowing over the three signal lines 301A are changed in level to L all at once. The charge control microcomputer 501 can also detect how many other battery modules are during the battery charging depending on how many of the three signal lines 301B are carrying the charge-state signal of H level. When detecting that any other k battery modules are during the battery charging (where k is an integer of 1 or larger), the charge control microcomputer 501 is allowed not to start the battery charging in the battery module of its own.

Second Embodiment

In the below, a second embodiment of the invention is described. Herein, only any difference from the first embodiment is mainly described, and the remaining is not described or simply described.

Figure 8:
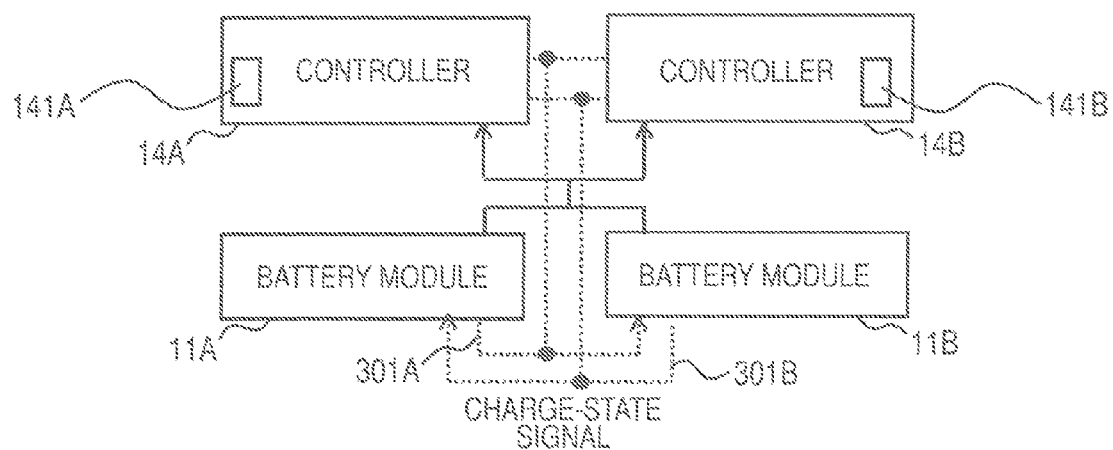
FIG. 8 is a diagram showing the internal configuration of a storage system of a second embodiment of the invention.

FIG. 8 is a diagram showing the internal configuration of a storage system of the second embodiment of the invention.

The controllers 14A and 14B are respectively connected with the first and second signal lines 301A and 301B. The controller 14A or 14B detects the state of the remaining controller 14B or 14A. The state of the controllers includes a state of first power consumption, e.g., operating state, and a state of second power consumption, e.g., standby state. In the state of second power consumption, the power consumption is lower in level than the state of first power consumption.

Figure 9:
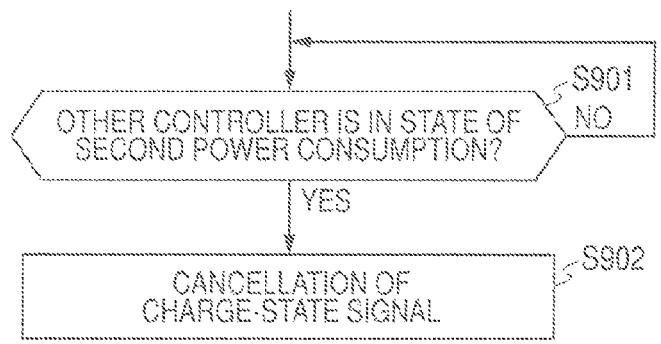
FIG. 9 shows a process to be executed by a controller in the second embodiment of the invention.

When the controller 14A in the state of first power consumption detects that the remaining controller 14B is in the state of second power consumption (S901 of FIG. 9: YES), the charge-state signals flowing over the first and second signal lines 301A and 301B are cancelled (S902 of FIG. 9). The expression of "the charge-state signals are cancelled" means that the charge-state signals are not received by the charge control microcomputer. Accordingly, when the controller 14B is in the state of second power consumption, the battery charging can be performed at the same time in the two battery modules 11A and 11B.

In this embodiment, exemplified below are (Power A) and (Power B). (Power A) denotes the power consumption as a result of battery charging in one battery module, and (Power B) denotes a difference of power consumption in one controller between the state of first power consumption and the state of second power consumption.

(Power B) is larger than (Power A), and thus when the controller is in the state of second power consumption, the battery charging may be performed at the same time in the two batter modules 11A and 11B.

This second embodiment can be applied to various other modified examples of the first embodiment.

In a first modified example, for example, the first and second signal lines (301A, 301B) and (301C, 301D) of each of the battery module pairs are connected with the controllers 14A and 14B, respectively. When the controller 14B is in the state of low power consumption, at least for one battery module pair, the controller 14A in the normal state cancels the charge-state signal flowing over the first and second signal lines (301A, 301B) and/or (301C, 301D).

About the cancellation of the charge-state signals in how many battery module pairs, it is set in advance or dynamically based on any desired rated power consumption for the storage system and (Power A) and (Power B) described above.

Ina second modified example, for example, every pair of signal lines (301A, 301B) is connected with the controllers 14A and 14B. In this case, when the controller 14A in the operating state detects that the remaining controller 14B is in the state of low power consumption, the charge-state signal flowing at least over a pair of first and second signal lines (301A, 301B) is cancelled. About the cancellation of the charge-state signals flowing over how many battery module pairs, it is set in advance or dynamically based on any desired rated power consumption for the storage system and (Power A) and (Power B) described above.

While the embodiments and the modified examples of the invention have been described in detail, the foregoing description is in all aspects illustrative and not restrictive. It is understood that numerous other modifications and variations can be devised without departing from the scope of the invention. For example, as an alternative to the method of notifying, i.e., detecting, the charge state by a voltage-level signal, the charge state may be notified, i.e., detected, by wireless communications by infrared radiation or others.

What is claimed is:

1. A storage system, comprising:
a power source;
a plurality of battery modules each having a battery configured to be charged with power supplied by the power source, each battery module being provided with a charge controller that controls charging of the battery of the battery module via a power supply from the power source, the plurality of battery modules being configured in one or more sets of battery modules, the charge controller of each battery module of each set of battery modules is connected to the charge controller of each other battery module of the set of battery modules for the battery module by a respective signal line for the charge controller over which a signal flows from the charge controller of the battery module to the charge controller of each other battery module of the set of battery modules of the battery module, the signal of the respective signal line for the charge controller of each battery module indicating whether the battery module is undergoing charging; and
a plurality of controller components that control access to a plurality of physical storage devices, each controller component being provided with a volatile memory that receives a power supply from the power source if any, and if not, receives a power supply from the battery of at least any one of the plurality of battery modules, each controller component being connected with the respective signal line for the charge controller of each battery module based on a configuration of the battery modules in the one or more sets of battery modules, and wherein upon any of the plurality of controller components that are in a state of first power consumption making a detection of a predetermined number of the plurality of controller components being in a state of second power consumption that is lower in power consumption than a state of first power consumption, the detecting controller component cancels the signal flowing over the respective signal line for the charge controller of each battery module of each of a predetermined number of the one or more sets of battery modules so that an indication that the battery module is undergoing charging is not received by the charge controller of any of the other battery modules to which the charge controller of the battery module is connected, the charge controller of each battery module, upon receiving a charging command for any of the battery modules, detects a quantity of the battery modules that are undergoing charging based on the signals flowing over the respective signal lines for the charge controllers of the other battery modules to which the charge controller of the battery module is connected and, if the quantity of the battery modules that are undergoing charging that is detected by the charge controller of the battery module is less than a predetermined number of the battery modules, initiates charging of the battery in any battery module for which a charging command is received, and the charge controller of each battery module, upon a count of the battery modules that are detected by the charge controller to be undergoing charging reaching the predetermined number of the plurality of battery modules, stops charging of the battery in any remaining battery modules that are also detected to be undergoing charging by the charge controller of the battery module.

2. The storage system according to claim 1, wherein the battery modules are each provided with a charger that supplies the power supply from the power source to the battery of the battery module, the charge controller of each battery module controls the power supply from the charger to the battery of the battery module, a charge control unit is configured by the plurality of charge controllers respectively provided to the plurality of battery modules, and in each of the battery modules, the charge controller provided to the battery module is configured to, upon the battery of the battery module having a voltage of a first value or smaller, perform the following operations:

(2-1) determine whether there is an indication of the predetermined number of battery modules undergoing charging from the signals flowing over the respective signal lines of the charge controllers of the of the other battery modules to which the charge controller of the battery module is connected, (2-2) regard, upon determining that there is not an indication of the predetermined number of the battery modules undergoing charging in operation (2-1), the signal flowing over the respective signal line for the charge controller of the battery module as indicating that the battery module to which the charge controller is provided is undergoing charging, (2-3) determine, upon completing operation (2-2), whether there is an indication of the predetermined number of battery modules undergoing charging from the signals flowing over the respective signal lines of the charge controllers of the of the other battery modules to which the charge controller of the battery module is connected, and (2-4) initiate, upon determining that there is not an indication of the predetermined number of the battery modules undergoing charging in operation (2-3), the power supply from the charger provided to the battery module to which the charge controller is provided to the battery of the battery module, and, upon the voltage of the battery of the battery module to which the charge controller is provided being increased to at least a second value that is equal to or larger than the first value, stop the power supply from the charger to the battery of the battery module to which the charge controller is provided and regard the signal flowing over the respective signal line for the charge controller of the battery module as indicating that the battery module to which the charge controller is provided is not undergoing charging.

3. The storage system according to claim 2, further comprising:

a circuit board including a power-source-use connector for connection with the power source, a plurality of battery-module-use connectors for connection with the plurality of battery modules, and a plurality of controller-use connectors for connection with the plurality of controller components, wherein the charge controller of each battery module is configured to perform the following operations:

(3-1) determine, upon determining that there is an indication of the predetermined number of the battery modules undergoing charging in operation (2-3), whether the battery module to which the charge controller is provided is connected to a predetermined one of any of the plurality of battery-module-use connectors, (3-2) initiate, upon determining that the battery module to which the charge controller is provided is connected to the predetermined battery-module-use connector in operation (3-1), the power supply from the charger provided to the battery module to which the charge controller is provided to the battery of the battery module, and, upon the voltage of the battery of the battery module to which the charge controller is provided being increased to at least the second value, stop the power supply from the charger to the battery of the battery module to which the charge controller is provided and regard the signal flowing over the respective signal line for the charge controller of the battery module as indicating that the battery module to which the charge controller is provided is not undergoing charging, and (3-3) regard, upon determining that the battery module to which the charge controller is provided is not connected to the predetermined battery-module-use connector in operation (3-1), the signal flowing over the respective signal line for the charge controller of the battery module as indicating that the battery module to which the charge controller is provided is not undergoing charging, and, after a lapse of a predetermined length of time, execute operation (2-1).

4. The storage system according to claim 3, wherein the one of more sets of battery modules are configured as one or more battery module pairs, and for the charge controller of each battery module, any of the other charge controllers provided to a battery module that is in a battery module pair with the battery module to which the charge controller is provided is an other-end charge controller to the charge controller.

5. The storage system according to claim 1, wherein
the battery modules are each provided with a charger that supplies the power supply from the power source to the battery of the battery module,
the charge controller of each battery module controls the power supply from the charger to the battery of the battery module,
a charge control unit is configured by the plurality of charge controllers respectively provided to the battery modules, and
in each of the battery modules, the charge controller provided to the battery module is configured to perform the following operations:
(6-1) determine whether there is an indication that the battery modules to which the charge controller is not provided are undergoing charging, and
(6-2) upon determining that there is an indication that the battery modules to which the charge controller is not provided are undergoing charging in operation (6-1), stop the power supply from the charger provided to the battery module to which the charge controller is provided to the battery of the battery module.

6. The storage system according to claim 5, wherein
the charge controller of each battery module is configured to perform the following operations:
(7-1) determine upon completing operation (6-2), whether there is an indication that the battery modules to which the charge controller is not provided are undergoing charging, and
(7-2) upon determining that there is an indication that the battery modules to which the charge controller is not provided are not undergoing charging in operation (7-1), initiate the power supply from the charger provided to the battery module to which the charge controller is provided to the battery of the battery module.

7. The storage system according to claim 6, wherein
the charge controller of each battery module is configured to perform the following operations:
(8-1) determine, upon determining that there is an indication that the battery modules to which the charge controller is not provided are undergoing charging in operation (7-1), whether the battery module to which the charge controller is provided is satisfying specific requirements,
(8-2) upon determining that the battery module to which the charge controller is provided is satisfying the specific requirements in operation (8-1), initiate the power supply from the charger provided to the battery module to which the charge controller is provided to the battery of the battery module, and
(8-3) upon determining that the battery module to which the charge controller is provided is not satisfying the specific requirements in operation (8-1), stop the power supply from the charger provided to the battery module to which the charge controller is provided to the battery of the battery module.

8. The storage system according to claim 5, wherein
the one of more sets of battery modules are configured as one or more battery module pairs, and
the charge controller provided to one battery module of each battery module pair determines whether the other battery module of the battery module pair is undergoing charging by referring to the signal flowing over the respective signal line for the charge controller of the other battery module.

9. The storage system according to claim 1, wherein, upon a detection being made that a second predetermined number of the plurality of controller components are in the state of second power consumption, a quantity of the battery modules equal to the predetermined number of the battery modules are charged concurrently.

10. The storage system according to claim 6, wherein
the one of more sets of battery modules are configured as one or more battery module pairs, and
the charge controller provided to one battery module of each battery module pair determines whether the other battery module of the battery module pair is undergoing charging by referring to the signal flowing over the respective signal line for the charge controller of the other battery module.

11. The storage system according to claim 7, wherein
the one of more sets of battery modules are configured as one or more battery module pairs,
the charge controller provided to one battery module of each battery module pair determines whether the other battery module of the battery module pair is undergoing charging by referring to the signal flowing over the respective signal line for the charge controller of the other battery module.

12. The storage system according to claim 5, wherein, upon a detection being made that a second predetermined number of the plurality of controller components are in the state of second power consumption, a quantity of the battery modules equal to the predetermined number of the battery modules are charged concurrently.

13. The storage system according to claim 6, wherein, upon a detection being made that a second predetermined number of the plurality of controller components are in the state of second power consumption, a quantity of the battery modules equal to the predetermined number of the battery modules are charged concurrently.

14. The storage system according to claim 7, wherein upon a detection being made that a second predetermined number of the plurality of controller components are in the state of second power consumption, a quantity of the battery modules equal to the predetermined number of the battery modules are charged concurrently.

15. The storage system according to claim 8, wherein, upon a detection being made that a second predetermined number of the plurality of controller components are in the state of second power consumption, a quantity of the battery modules equal to the predetermined number of the battery modules are charged concurrently.

* * * * *